(12) United States Patent
Chang et al.

(10) Patent No.: US 10,157,201 B2
(45) Date of Patent: Dec. 18, 2018

(54) METHOD AND SYSTEM FOR SEARCHING FOR AND PROVIDING INFORMATION ABOUT NATURAL LANGUAGE QUERY HAVING SIMPLE OR COMPLEX SENTENCE STRUCTURE

(71) Applicant: NAVER CORPORATION, Seongnam-si (KR)

(72) Inventors: Jae Hyeok Chang, Seongnam-si (KR); Ki Young Kim, Seongnam-si (KR); Myeong Seok Kim, Seongnam-si (KR); Ji Hye Choi, Seongnam-si (KR); Won Jin Lee, Seongnam-si (KR); Hyun Ah Lee, Seongnam-si (KR); Yong Hun Lee, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 525 days.

(21) Appl. No.: 14/796,074

(22) Filed: Jul. 10, 2015

(65) Prior Publication Data
US 2016/0012105 A1    Jan. 14, 2016

(30) Foreign Application Priority Data

Jul. 10, 2014 (KR) ........................ 10-2014-0086954

(51) Int. Cl.
*G06F 17/30* (2006.01)
*G06F 17/00* (2006.01)

(52) U.S. Cl.
CPC .... *G06F 17/30401* (2013.01); *G06F 17/3043* (2013.01); *G06F 17/30424* (2013.01); *G06F 17/30448* (2013.01); *G06F 17/30554* (2013.01)

(58) Field of Classification Search
CPC ........... G06F 17/30684; G06F 17/2785; G06F 17/28; G06F 17/271; G06F 17/274;
(Continued)

(56) References Cited

U.S. PATENT DOCUMENTS 6,246,977 B1 *  6/2001  Messerly .......... G06F 17/30684
                                              704/10
6,453,312 B1 *  9/2002  Goiffon ............. G06F 17/30643
(Continued)

FOREIGN PATENT DOCUMENTS

JP     2003-330959    11/2003
JP     2005-208825     8/2005

OTHER PUBLICATIONS

Office action issued in corresponding Japanese Application, dated Apr. 26, 2016.

*Primary Examiner* — Yicun Wu
(74) *Attorney, Agent, or Firm* — Greer, Burns & Crain, Ltd.

(57) ABSTRACT

A method of searching for and providing information about a natural language query having a simple or complex sentence structure, includes: generating a mashup query language having a tree structure in a plurality of levels based on at least one query entity included in a natural language query language via a semantic analysis of the natural language query language; determining whether the plurality of levels are linked through a query entity forming each of the plurality of levels based on attribute information of the mashup query language; searching for data corresponding to the query entity forming each of the plurality of levels from a knowledge database based on a result of the determining, and deriving main information and at least one piece of entity information corresponding to the natural language query language from found data; and laying out a search
(Continued)

result screen including the main information and the at least one piece of entity information.

20 Claims, 11 Drawing Sheets

(58) Field of Classification Search
CPC ........... G06F 17/30654; G06F 17/2705; G06F 17/275; G06F 17/30424; G06F 17/3002; G06F 17/30029; G06F 17/30064; G06F 17/30613; G06F 17/30796; G06F 3/167; G06F 17/2765; G06F 17/3053; G06F 17/30598; G06F 17/30401; G06F 17/30864; G06F 17/30666; G06F 17/30672; G06F 17/2775; G06F 17/30663; G06F 17/30734; G06F 17/30867; G06F 17/241; G06F 17/248; G06F 17/27; G06F 17/2755; G06F 17/278; G06F 17/3043
See application file for complete search history.

(56) References Cited

U.S. PATENT DOCUMENTS

| | | | | |
|---|---|---|---|---|
| 6,510,434 | B1* | 1/2003 | Anderson | G06F 17/3061 |
| 8,195,683 | B2* | 6/2012 | Bolivar | G06F 17/30672 |
| | | | | 704/257 |
| 2008/0249764 | A1* | 10/2008 | Huang | G06F 17/2785 |
| | | | | 704/9 |
| 2009/0326925 | A1* | 12/2009 | Crider | G06F 8/30 |
| | | | | 704/9 |
| 2010/0063799 | A1* | 3/2010 | Jamieson | G06F 17/30731 |
| | | | | 704/9 |
| 2010/0174526 | A1* | 7/2010 | Zhang | G06F 17/271 |
| | | | | 704/9 |

\* cited by examiner

FIG. 2

```
{
  "mode":"default"
  "nql":{
    "object/name":"Girls Generation" (211)
    "person/member":{   (212)
        "person/movie_performed":null (213)
        "movie/person(member)":{   (222)
            "movie=member performed" (231)
        }
    }
  }
}
```

210 = { (211), (212) }
220 = { (213), (222) }
230 = { (231) }

200

METHOD AND SYSTEM FOR SEARCHING FOR AND PROVIDING INFORMATION ABOUT NATURAL LANGUAGE QUERY HAVING SIMPLE OR COMPLEX SENTENCE STRUCTURE

RELATED APPLICATION

This application claims the benefit of Korean Patent Application No. 10-2014-0086954, filed on Jul. 10, 2014, in the Korean Intellectual Property Office, the disclosure of which is incorporated herein in its entirety by reference.

BACKGROUND OF THE INVENTION

1. Field of the Invention

The present invention relates to a method of extracting and providing information about a natural language query, and more particularly, to a method and system for efficiently providing information related to a search result and a query entity, which match a user query intention, with respect to a sense-tagged natural language query having a simple or complex sentence structure.

2. Description of the Related Art

Ontology defines semantic relations between real-world objects such that a computer provides semantic specifications about information for accessing information inferred from complex relations between the real-world objects, and may be applied to various fields, such as artificial intelligence, information retrieval, and electronic commerce.

In detail, ontology expresses a variety of information on the web in semantic relations between targets, and thus logical query results that were unable to be found via general keyword-based searches in information retrieval fields may be obtained. For example, by using ontology, a result of a query, such as "what is the capital of a country that has the population of at least seventy million and is adjacent to the sea?", may be obtained.

Such ontology information retrieval is effective in three aspects compared to keyword-based searches. First, the keyword-based searches provide only documents including an input keyword as search results, but the ontology information retrieval may directly provide a certain target a user wishes to find and attribute information about the certain target. Second, the keyword-based searches do not guarantee a search result that reflects relations between input keywords, but the ontology information retrieval may find information based on relations with other targets characterizing a target to be found. Third, the keyword-based searches only search preexisting information, but the ontology information retrieval may infer new information by finding a new relation between targets.

The ontology information retrieval largely helps to improve user convenience by immediately finding a query target desired by a user, but since an ontology query language that is not familiar to general users has to be used, the ontology information retrieval may be difficult to be approached by the general users. In other words, for the general users to access information built according to ontology, the general users have to learn a structure of ontology or an ontology query language, and thus utility of ontology may be low.

Meanwhile, a natural language is sufficient to express a logical meaning expressed in an ontology query language and is familiar to general users. Accordingly, if ontology information is accessible via a natural language query, the general users may easily access the ontology information, and thus utility of the ontology information retrieval may increase.

In order to access ontology information via a natural language query, a technology of converting the natural language query to an ontology query language is required. Accordingly, first, the structure and the meaning of the natural language query are analyzed by using a natural language processing technology; objects and relations of ontology, which correspond to natural language expressions, are found based on the analyzed structure and meaning; and the natural language query is converted to the ontology query language according to a grammar structure of the ontology query language.

However, in this case, there may be an inaccessible ontology query language due to errors in analyzing the structure and the meaning of the natural language query. In detail, there is no guarantee that a general natural language processing technology has all language resources required to process natural language expressions accessible to search target ontology, and since a minor grammatical error may produce a wrong analysis result, an inaccessible ontology query language may be generated.

Thus, according to a general search method, a user has to learn query types processable by a system through several trials and errors regarding a query having an error. In this case, a user who uses ontology-based information retrieval for the first time may not know which query is useful since the user is not aware of a query type accepted by a natural language processing technology and details about information built according to ontology.

Furthermore, according to such a general search method, a service provider is unable to provide all ontology information and sufficiently show utility of information owned by the service provider.

Most users wish to use ontology prepared by a service provider intuitively like keyword-based searches rather than meticulously learning information about the ontology or a query input method, and utilization and satisfaction on a new system are low compared to time and efforts invested to adapt to the new system.

Accordingly, studies on natural language understanding (NLU) are being conducted to increase utility and accuracy of information retrieval. NLU is used to determine an intention of a query of a user, wherein a query spoken or input in text by the user is an input and a list obtained by determining the intention of the query via NLU is an output of the query.

A sense-tagged natural language query may be complex compared to a general keyword-based query, but it is difficult to accurately determine the intention of the user and provide a search result matching the intention.

SUMMARY OF THE INVENTION

One or more embodiments of the present invention include a method and system for providing, in stages, information matching a user query intention by analyzing a sense-tagged natural language query having a simple or complex sentence structure and searching, in stages, data from an upper entity to a lower entity in a hierarchical tree structure.

One or more embodiments of the present invention include a layout method for extracting and efficiently providing, together with a search result on a query of a user, entity information found based on an entity forming a natural language query having a complex sentence structure.

Additional aspects will be set forth in part in the description which follows and, in part, will be apparent from the description, or may be learned by practice of the presented embodiments.

According to one or more embodiments of the present invention, a method of searching for and providing information about a natural language query having a simple or complex sentence structure includes: generating a mashup query language having a tree structure in a plurality of levels based on at least one query entity included in a natural language query language via a semantic analysis of the natural language query language; determining whether the plurality of levels are linked through a query entity forming the mashup query language of each of the plurality of levels based on attribute information of the mashup query language; searching for data corresponding to the query entity forming the mashup query language of each of the plurality of levels from a knowledge database based on the result of the determining, and deriving main information and at least one piece of entity information corresponding to the natural language query language from the searched data; and laying out a search result screen comprising the main information and the at least one piece of entity information.

Generating the mashup query language may include: determining whether the natural language query language has a simple sentence structure or a complex sentence structure via the semantic analysis of the natural language query language; when the natural language query language has the complex sentence structure, deriving at least two query phrases from the natural language query language; and generating the mashup query language having the tree structure based on the at least two query phrases.

Determining whether the plurality of levels are linked may include: analyzing attribute and domain information of the mashup query language; selecting search environment information corresponding to the mashup query language according to the result of the analyzing; and normalizing the mashup query language by using the selected search environment information.

Determining whether the plurality of levels are linked may further include converting the normalized mashup query language to an object query language by using the selected search environment information.

When it is determined that the plurality of levels are linked, searching for the data may include: searching for and deriving data corresponding to the uppermost level entity of the mashup query language from the knowledge database; and searching for and deriving data corresponding to consecutive lower level entities from the knowledge database based on the data corresponding to the uppermost level entity, wherein searching for the data is repeated until data corresponding to the lowermost level entity of the mashup query language is searched for and derived.

Searching for the data further may include deriving the data corresponding to the lowermost level entity as the main information and deriving the data corresponding to the remaining level entities as the at least one piece of entity information.

Laying out of the search result screen may include outputting the data corresponding to the uppermost level entity at the top region of the search result screen and outputting the data corresponding to the consecutive lower level entities below the data corresponding to the uppermost level entity, wherein the data corresponding to the lowermost level entity is output as the main information.

Laying out of the search result screen may include processing the main information and the at least one piece of entity information to compressed information comprising at least one of at least one piece of attribute information, image information, and video information.

The method may further include: when a user input of selecting one of the at least one piece of entity information is received on the search result screen, processing the selected piece of entity information as entity detail information; and changing the layout of the search result screen by dividing the search result screen into a compressed information region where the main information and the at least one piece of entity information are output, and a detail information region where the entity detail information is output.

When it is determined that the plurality of levels are not linked, searching for the data may include: searching for and deriving data corresponding to the query entity of each of the plurality of levels from the knowledge database; and deriving final result data by applying a logical operation according to the result of the semantic analysis on the data corresponding to the query entity of each of the plurality of levels.

Searching for the data further may include deriving the final result data as the main information and the data corresponding to the query entity of each of the plurality of levels as the at least one piece of entity information.

Laying out of the search result screen may include laying out the search result screen by dividing the search result screen into a main information region where the main information and main information-related information are output, and an entity region where the at least one piece of entity information is output.

Laying out of the search result screen may include, when the main information is single attribute information, processing and providing the main information to a form of a natural language based response.

According to one or more embodiments of the present invention, a system for searching for and providing information about a natural language query having a simple or complex sentence structure includes: a natural language process engine configured to generate a mashup query language having a tree structure in a plurality of levels based on at least one query entity included in a natural language query language input through a user device via a semantic analysis of the natural language query language; a search engine configured to determine whether the plurality of levels are linked based on attribute information of the mashup query language and search for data corresponding to a query entity forming each of the plurality of levels, wherein the search engine processes, from the data corresponding to the query entity, main information and at least one piece of entity information, which correspond to the natural language query language, and displays the main information and the at least one piece of entity information on the same search result screen.

The natural language processing engine may include: a semantic analyzing module configured to determine whether the natural language query language has a simple sentence structure or a complex sentence structure via the semantic analysis of the natural language query language, and when the natural language query language has the complex sentence structure, derive at least two query phrases from the natural language query language; and a mashup query language converting module configured to generate the mashup query language based on the at least two query phrases.

The search engine may include: a mashup query language normalizing module configured to analyze attribute information of the mashup query language to select search environment information corresponding to the mashup query language, and normalize the mashup query language by using the selected search environment information; an object query language converting module configured to convert the normalized mashup query language to an object query language by using the selected search environment information; a data deriving module configured to generate result data by searching for and deriving physical data of the object query language from a knowledge database according to the selected search environment information; and a data processing module configured to process the result data according to the selected search environment information and generate a search result screen comprising the processed result data.

When the mashup query language normalizing module determines that the plurality of levels are linked, the data deriving module may derive data corresponding to the uppermost level entity of the mashup query language from the knowledge database, derive data corresponding to consecutive lower level entities from the knowledge database based on the data corresponding to the uppermost level entity, and sequentially derive data until data corresponding to the lowermost level entity of the mashup query language is derived.

The data deriving module may derive the data corresponding to the lowermost level entity as the main information and derive the data corresponding to the remaining level entities as the at least one piece of entity information.

The data processing module may output the data corresponding to the uppermost level entity at the top region of the search result screen, output the data corresponding to the consecutive lower level entities below the data corresponding to the uppermost level entity, and output the data corresponding to the lowermost level entity as the main information.

The data processing module may process the main information and the at least one piece of entity information to compressed information comprising at least one of at least one piece of attribute information, image information, and video information.

When a user input of selecting one of the at least one piece of entity information is received on the search result screen, the data processing module may process the selected piece of entity information as entity detail information, and change the layout of the search result screen by dividing the search result screen into a compressed information region where the main information and the at least one piece of entity information are output, and a detail information region where the entity detail information may be output.

When the mashup query language normalizing module determines that the plurality of levels are not linked, the data deriving module may search for and derive data corresponding to each level entity of the mashup query language from a knowledge database, and derive final result data by applying a logical operation according to the result of the semantic analysis on the data corresponding to the each level entity.

The data deriving module may derive the final result data as the main information and the data corresponding to the each level entity as the at least one piece of entity information.

The data processing module may lay out the search result screen by dividing the search result screen into a main information region where the main information and main information-related information are output, and an entity region where the at least one piece of entity information is output.

When the main information is single attribute information, the data processing module may process and provide the main information to a form of a natural language based response.

BRIEF DESCRIPTION OF THE DRAWINGS

The above and other objects, features and other advantages of the present invention will be more clearly understood from the following detailed description taken in conjunction with the accompanying drawings, in which:

FIG. 2 is a diagram of an example of a mashup query language having a tree structure, which is converted from a natural language query language, according to an embodiment of the present invention;

DESCRIPTION OF THE PREFERRED EMBODIMENTS

Figure 1:
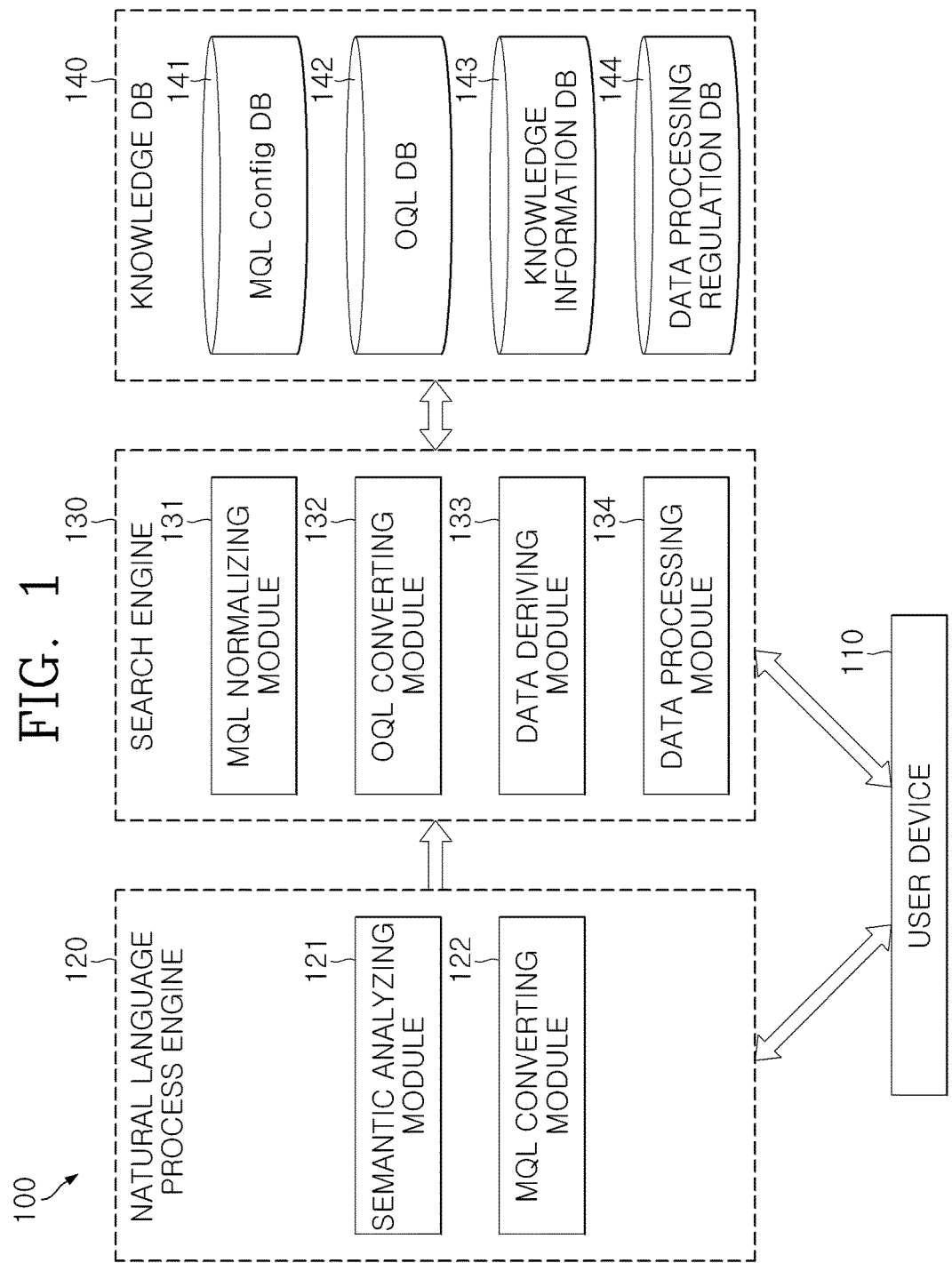
FIG. 1 is a diagram of a search system based on a natural language query, according to an embodiment of the present invention.

As the invention allows for various changes and numerous embodiments, particular embodiments will be illustrated in the drawings and described in detail in the written description. In the description of the present invention, certain detailed explanations of related art are omitted when it is deemed that they may unnecessarily obscure the essence of the invention.

Hereinafter, exemplary embodiments of the present invention will be described in detail with reference to the accompanying drawings. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

The present invention relates to a method of extracting and providing information about a natural language query, and in detail, to a method and system for efficiently providing information related to a search result and a query target, which match a user query intention, with respect to a sense-tagged natural language query.

FIG. 1 is a diagram of a search system 100 based on a natural language query, according to an embodiment of the present invention.

Referring to FIG. 1, the search system 100 includes a natural language process engine 120 based on natural language understanding (NLU) for analyzing a user query language input through a user device 110, a search engine 130, and a knowledge database (DB) 140. The natural language process engine 120, the search engine 130 and the knowledge DB 140 may be configured as at least one server apparatus. When the natural language process engine 120, the search engine 130 and the knowledge DB 140 are configured as separate server apparatuses respectively, the natural language process engine 120, the search engine 130 and the knowledge DB 140 communicate with each other via a network (not shown) by using a Network Interface Card (NIC), wireless radio controller, etc. Also, the natural language process engine 120, the search engine 130 and the knowledge DB 140 may communicate with the user device 110 via the network by using a Network Interface Card (NIC), wireless radio controller, etc. A semantic analyzing module 121, a MQL converting module 122, a MQL normalizing module 131, OQL converting module 132, a data deriving module, a data processing module 134 may be configured as at least one microprocessor which may be controlled by at least one program stored in memory (not shown).

The natural language process engine 120 analyzes a sense-tagged complex query language based on a natural language, which is input through the user device 110, to convert the sense-tagged complex query language to a mashup query language (MQL) via a semantic analysis, and the search engine 130 derives and provides query-requested information from the knowledge DB 140 pre-built based on MQLs generated by the natural language process engine 120, to the user device 110.

In detail, the search engine 130 may derive and provide a search result and entity information corresponding to a query entity, which match a user query that is finally derivable through an MQL. Herein, a query entity means a "search target" for deriving a search result through a knowledge DB, and at least one query entity may be included in one user query.

Each component of the search system 100 according to an embodiment of the present invention will now be briefly described.

The natural language process engine 120 includes a semantic analyzing module 121 that performs a semantic analysis on a user query, and an MQL converting module 122 that converts a user query language based on a natural language to an inferable MQL based on a result of the semantic analysis.

The semantic analyzing module 121 analyzes whether the user query language has a simple sentence structure or a complex sentence structure, and derives a user query intention and a detail query phrase included in the user query language by analyzing relations between a plurality of morphemes forming the user query language.

For example, by analyzing a user query "which movie did members of the singer group A appear?", a relation between the "singer group A" and the "member", a relation between the "member" and the "movie", and a relation between the "movie" and "information" may be derived. In this regard, hierarchical query phrases from an upper concept to a lower concept, such as "the members of the singer group A", "a movie each member appeared", and "basic information about the movie", may be established from the user query.

As another example, by performing a semantic analysis on a user query "which actress is the same age as the actress B?", query phrases in the same level, such as "what is the age (N) of the actress B?" and "which actress is N years old?", may be derived.

The MQL converting module 122 generates an MQL having a tree structure such that at least one query phrase included in a user query is inferred based on a result of the semantic analysis performed by the semantic analyzing module 121. In other words, the MQL converting module 122 is a module that converts the user query language based on the natural language to the MQL that is a query language.

Herein, an MQL is a query language that assigns attributes of service by analyzing a query language, and is designed to query a knowledge DB by sense-tagging a query of a user in a natural language. An MQL has a double structure, wherein a search result is generated by using logical attributes externally and using physical attributes of a knowledge DB internally.

In other words, an MQL is a language for independently building a logical structure without following a physical structure of a knowledge DB and defining a relation between the logical structure and the physical structure through setting, thereby providing suitable data according to query types and service types. For example, when a user query language includes word classes "how old", an MQL obtained based on the user query language may assign "age" as an attribute.

An MQL having a tree structure, which is generated by the MQL converting module 122 is shown in FIG. 2. Thus, the MQL will be described in detail later with reference to FIG. 2.

Next, the search engine 130 performs information retrieval on the knowledge DB 140 based on an MQL having a tree structure based on a natural language query generated by the natural language process engine 120. In detail, the search engine 130 derives and provides main information matching a user query finally derivable through the MQL, and entity information corresponding to each query phrase or each query entity.

Herein, "main information" is a search result on information requested by a user query, and may be information derived by performing a logical operation on a query having a complex sentence structure based on at least one piece of physical data derived per level, according to a user query intention. Also, "entity information" may be data derived per entity or level that forms a user query. In other words, entity information may be information used to finally derive main information or information linked to physical data used to derive the main information.

Table 1 below shows examples of main information and entity information provided as search results of a user query.

TABLE 1

| User Query | Main Information | Entity Information |
|---|---|---|
| Who is a heroine of the movie Titanic? | The heroine of the movie Titanic is Kate Winslet. | Information about the movie Titanic (released date, genre, plot, characters, etc.) |
| Which novel is written by Wanseo Park? | List of books written by Wanseo Park | Profile of Wanseo Park (photo, birthday, occupation, recent work, etc.) |
| What is the size of a minipig? | An average weight of minipigs is about 60 kg. | Information about a minipig (photo, scientific name, family, color of body, area of distribution, etc.) |
| What language is used in Spain? | The language of Spain is Spanish. | Information about Spain (capital, language, currency, GDP, etc.) |
| Which movie did members of Girls Generation appear? | Information about movies in which each member of Girls Generation appeared | Profile of members of Girls Generation (photo, birthday, activity, etc.) |

In order to provide such main information and entity information, the search engine 130 includes an MQL normalizing module 131 that analyzes and normalizes attributes of an MQL transmitted from the natural language process engine 120, an object query language (OQL) converting module 132 that converts the normalized MQL to an OQL for searching the knowledge DB 140, a data deriving module 133 that searches for and derives data corresponding to the OQL based on the knowledge DB 140, and a data processing module 134 that lays out a search result screen by processing the derived data to match a user query having a complex sentence structure.

Herein, an OQL may be a language optimized for searching a knowledge DB, and uses a physical structure used by the knowledge DB. For example, in the above embodiment, an MQL "age" obtained by converting a user query language "how old" may be converted to an OQL that is "a query language for calculating an age by using a current year and a year of birth".

The knowledge DB 140 includes an MQL config DB 141 that stores a variety of search environment information (MQL_config) selectable according to attributes of an MQL, an OQL DB 142 that stores attribute information and regulation information required to convert an MQL to OQL, a knowledge information DB 143, and a data processing regulation DB 144.

Referring to each component of the search engine 130, the MQL normalizing module 131 derives MQL_config matching a user query intention from the MQL config DB 141 by analyzing attributes of an MQL having a tree structure, and converts the MQL received from the natural language process engine 120 to a normalized MQL (MQL normalization) based on the MQL_config.

Herein, MQL_config may be search environment information defining at least one of a search point, a search condition, and a search data processing method, which match a user query intention, while considering a query mode, a query domain, and a query property. Here, a query mode may mean a user query type, such as an answer type, a comparison type, a relation type, or a graph type, a query domain may mean a semantic category of a query target or an attribute, such as a person, a movie, a broadcast, a publication, a webtoon, an art work, a plant, an animal, a cultural asset, wine, or a game, and a query property may mean a unit of describing a relation between query targets or a target.

Accordingly, the MQL normalizing module 131 may select an MQL_config matching a user query intention from the MQL config DB 141 by analyzing attributes related to at least one of a query mode, a query domain, and a query property with respect to an MQL having a tree structure, and convert the MQL to MQL_normalization based on the MQL_config.

At this time, the MQL normalizing module 131 may generate the MQL_normalization by adding clue information for deriving additional data for accessing the user query intention according to the MQL_config, to the MQL_normalization.

The OQL converting module 132 converts the MQL_normalization generated by the MQL normalizing module 131 to an OQL based on the OQL DB 142. Here, the OQL converting module 132 may obtain the OQL capable of deriving desired data by using physical attribute values of the knowledge information DB 143 based on a physical domain and attributes of the MQL based on the MQL_config.

The data deriving module 133 derives physical data by searching the knowledge information DB 143 based on the OQL obtained by the OQL converting module 132, and derives main information and entity information according to the MQL_config by using the physical data. The main information may be final result data derived based on a logical structure obtained by converting an OQL-based physical structure result, and the entity information may be physical data derived during each operation of the MQL or physical data linked to a query entity.

The data processing module 134 processes the main information and the entity information derived by the data deriving module 133 according to the MQL_config, and lays out a search result screen including the main information and the entity information. Here, the data processing module 134 may process the main information and the entity information based on data processing regulations matching the MQL_config, which are read from the data processing regulation DB 144 interworking with the MQL config DB 141. For example, the main information and the entity information may be processed and the search result screen may be laid out based on a basic disclosure attribute, an image providing method, a data aligning method, and a link generating method, which are defined according to MQL_config domain.

Also, the data processing module 134 may variously set a layout method of the search result screen even when the same main information and the same entity information are included in the search result screen.

For example, the main information or the entity information may be information about a single object or information about at least two objects in the same level, based on a user query type. The data processing module 134 may form a single-type layout or a list-type layout in which a plurality of search results are listed, based on a search result of the main information or the entity information, and when a search result is a short answer, such as a number or a name, the main information may be processed to a form of a sentence including the search result.

Furthermore, when a user requests for detail information regarding the main information or the entity information, the data processing module 134 may process the search result screen such that the detail information is disclosed while compressed information of the main information and the entity information is provided on the search result screen.

FIG. 2 is a diagram of an example of an MQL 200 having a tree structure, which is converted from a natural language query language, according to an embodiment of the present invention.

Referring to FIG. 2, a user query language is "which movie did members of Girls Generation appear?", and the natural language process engine 120 may perform a semantic analysis on the user query language to extract entities such as "Girls Generation (a singer group name), members (attributes), and movies (attributes)". Then, the natural language process engine 120 may generate query phrases from an upper concept to a lower concept, such as "members of Girls Generation>movies the members appeared>movie information" by analyzing relations between the entities, and generate the MQL 200 of FIG. 2 based on the query phrases. Referring to the MQL 200, a first level 210 is obtained by converting "members of Girls Generation" to an MQL, and "object/name":Girls Generation" 211 and "person/member" 212 that is attribute information thereof may be obtained. A second level 220 is obtained by converting "movies the members appeared" to an MQL, and "person/movie_performed" 221 and "movie/person(member)" 222 may be obtained as attribute information of "person/member" 212. A third level 230 may be configured as "movie_member performed" 231 that is detail information of a movie and attribute information of "movie/person(member)" 222.

The MQL 200 of FIG. 2 is generated by the natural language process engine 120, and the search engine 130 may derive main information and entity information of a user query by using such an MQL 200.

Figure 3:
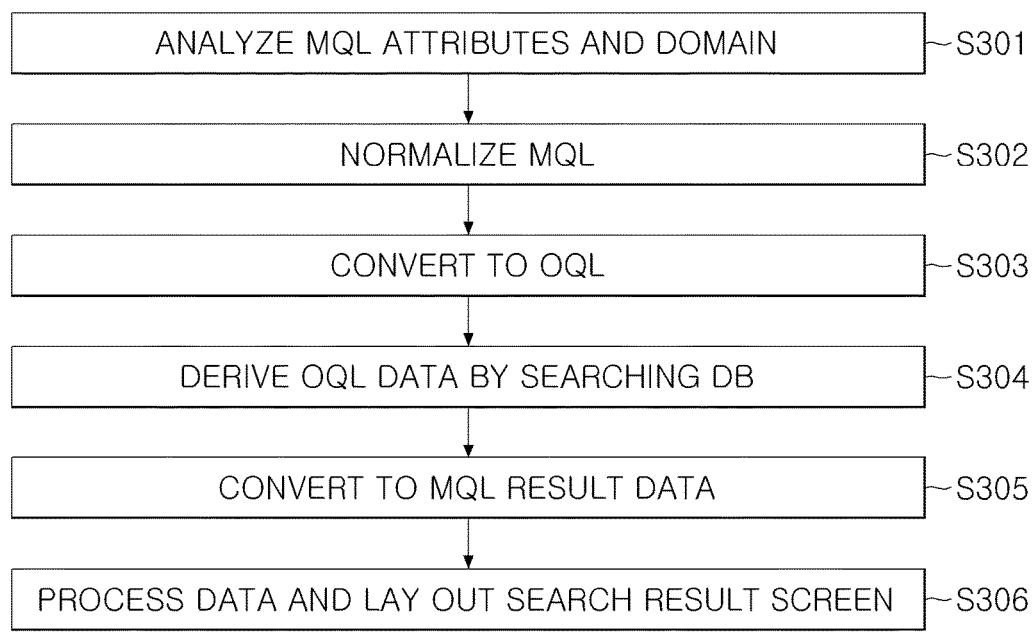
FIG. 3 is a flowchart of a process of providing, by a search engine, information based on a mashup query language received from a natural language process engine, according to an embodiment of the present invention.

FIG. 3 is a flowchart of processes of providing, by the search engine 130, information based on an MQL received from the natural language process engine 120, according to an embodiment of the present invention.

Referring to FIG. 3, the search engine 130 according to an embodiment of the present invention analyzes a tree structure and an MQL domain included in the MQL received from the natural language process engine 120, in operation S301.

Based on the result of the analysis, the search engine 130 derives an MQL_config matching a user query intention from the MQL config DB 141, and normalizes the MQL received from the natural language process engine 120 to MQL_normalization based on the MQL_config, in operation S302.

As described above with reference to Table 1, the MQL_config is search environment information defined according to characteristics, such as a query mode, a query domain, and a query property, based on attributes of a user query language, and may differ according to the user query intention. Here, attributes of main information optimized to the user query intention and entity information according to query entities may vary according to characteristics of the MQL_config applied to the MQL, and an information providing method may also vary.

In addition, MQL_normalization may be obtained by further including an additional data search point for providing the main information and the entity information. For example, when information such as a movie about a certain person is a query attribute, MQL_normalization may be generated by setting the additional data search point such that information about the movie and information about other people in the movie are also provided as entity information linked to a query entity.

After normalizing the MQL, the search engine 130 converts the MQL_normalization to an OQL that is a query language for querying the knowledge database 140, according to the MQL_config, in operation S303.

Then, the knowledge database 140 is searched by using the OQL, and OQL data that is physical data is derived in operation S304. While deriving the physical data, the maximum number of search values per attribute according to a query type, a number of to be used for a search, and a number of attributes used for a result may vary according to MQL_config mode.

Then, the OQL data is converted to MQL result data according to a data processing method pre-set based on the MQL_config, in operation S305.

Upon deriving the MQL result data, the search engine 130 may lay out and provide a search result screen to a user in operation S306 according to a search result providing method reflecting the user query intention by applying data processing regulations matching the MQL_config.

According to an embodiment of the present invention, when a query type requests for a single search result, main information may be processed to a single search result derived via a search. For example, when a search query is "a number of audiences of a movie C", main information provided as a search result may be processed to a single search result in a sentence "the number of audiences of the movie C is N" based on data "the number of audiences of the movie C=N" derived in operation S305, and a single-type layout including the single search result may be formed.

According to another embodiment, when a query type requests for at least two search results, main information may be processed such that a plurality of search results is listed. For example, when a search query is "books written by a novelist D", main information provided as a search result may be obtained by processing information about each book based on data "at least one book written by the novelist D" derived in operation S305, and the main information may be displayed in a list-type layout where the at least one book is listed.

Figure 4:
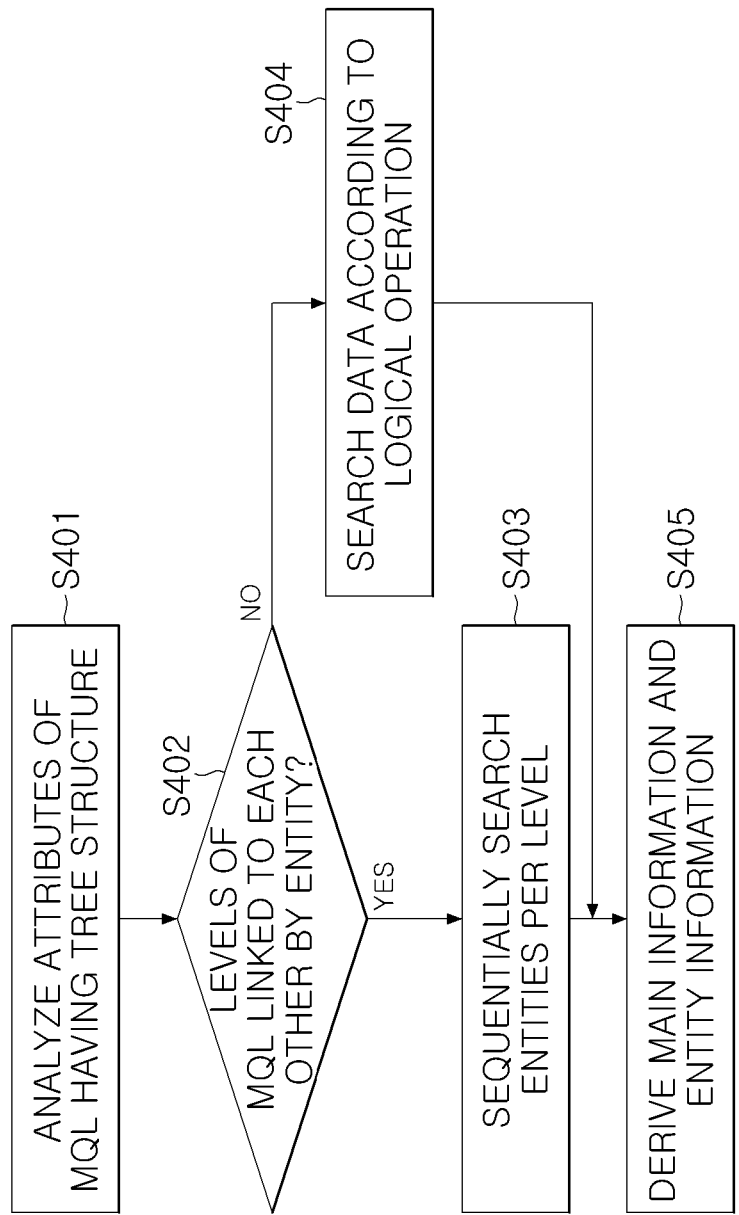
FIG. 4 is a flowchart of a process of deriving, by a search engine, main information and entity information by searching data according to attributes of a mashup query language having a tree structure, according to an embodiment of the present invention.

FIG. 4 is a flowchart of a process of deriving, by the search engine 130, main information and entity information by searching data according to attributes of an MQL having a tree structure, according to an embodiment of the present invention.

The search engine 130 according to an embodiment of the present invention may determine whether levels of the MQL are linked to each other by a query entity by analyzing attributes of the MQL in operation S401. As described above, the MQL is obtained by deriving a plurality of query phrases included in one user query having a complex sentence structure via a semantic analysis performed on the user query, and setting each query phrase as one level.

When it is determined that the levels are linked to each other in operation S402, data is searched from an upper entity to a lower entity in operation S403.

For example, by analyzing a user query "which movie did members of the singer group A appear?", three query phrases, such as "the members of the singer group A", "movies each member appeared", and "basic information of the movies", may be derived. Also, each query phrase includes "the singer group A", "the members" of the singer group A, and "the movies" each member appeared as entities, and the entities may be linked from an upper entity to a lower entity.

When it is determined that the levels are not linked to each other in operation S402, data is searched per level according to a logical operation in operation S404.

For example, when a user query is "which actress is the same age as the actress B?", query phrases, such as "what is the age (N) of the actress B?" and "which actress is N years old?", may be obtained via a semantic analysis. Here, with respect to an entity "actress B", the "age (N)" is not an entity but is an attribute value of the entity "actress B", and thus "the age (N) of the actress B" and "an actress who is N years old" are not in upper-lower levels that are linked to each other. In this case, data corresponding to "the age (N) of the actress B" is derived, "people" who are "N years old" are inversely searched for, and data satisfying "occupation-actor" and "gender-female" is selected from among the "people", according to a logical operation.

The search engine 130 derives search data finally derived through operations S402 through S404 as main information, and search data derived according to each query entity during operations S402 through S404 as entity information, in operation S405.

For example, regarding a user query "which movie did members of the singer group A appear?", main information may be information about movies each member appeared, and entity information may be information about the singer group A and a profile of each member of the singer group A. As another example, regarding a user query "which actress is the same age (N) as the actress B?", main information may be information about actresses who are N years old, and entity information may be information about the actress B and profiles of the actresses who are N years old.

Figure 5:
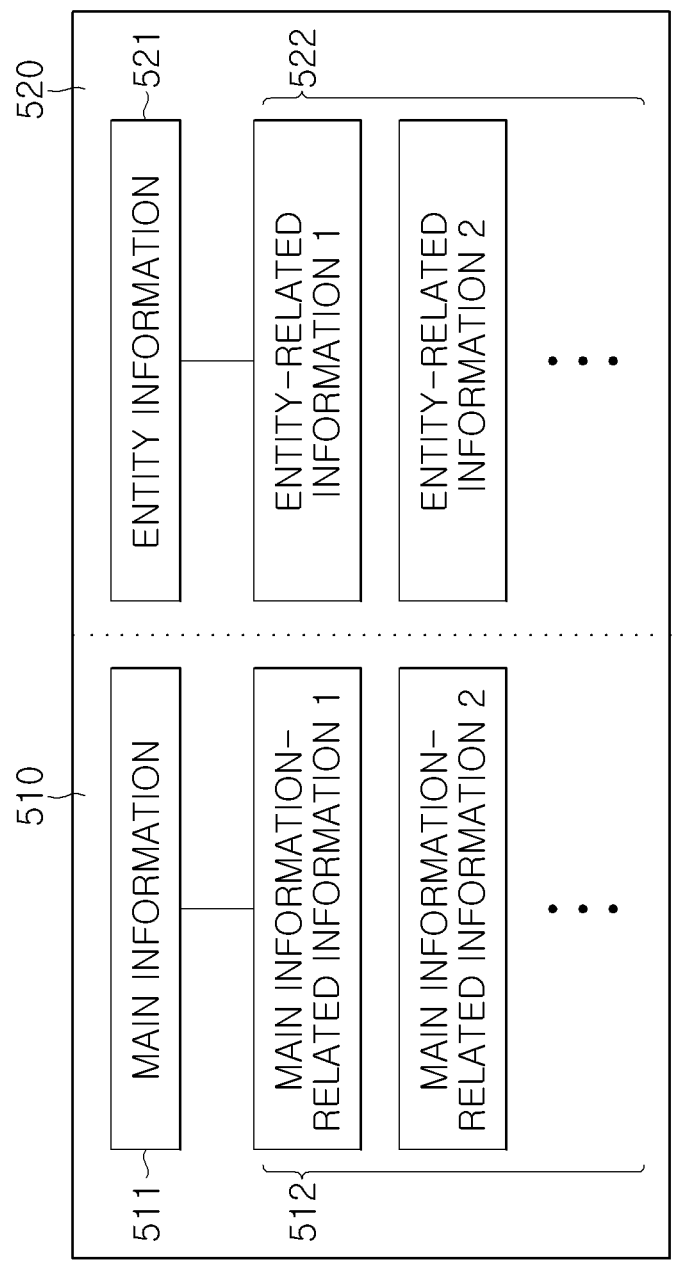
FIG. 5 is a diagram for describing laying out of information derived by a search engine, according to an embodiment of the present invention.

FIG. 5 is a diagram for describing laying out of information derived by the search engine 130, according to an embodiment of the present invention, wherein a search result on a query having a single sentence structure is provided.

Referring to FIG. 5, the search engine 130 simultaneously provides main information 511 and entity information 521, which are derived as search results of a user query. Here, regions where the main information 511 and the entity information 521 are exposed may be divided into a main information region 510 and an entity region 520, and the main information 511 and main information-related information 512 may be exposed in the main information region 510 and the entity information 521 and entity-related information 522 may be exposed in the entity region 520.

Also, when the main information 511 is information about a single object, the main information 511 may be laid out in a single type which shows the information about the single object in the main information region 510, and when the main information 511 is information about at least two objects, the main information 511 may be laid out in a list type which shows the information about at least two objects in the main information region 510. Furthermore, the entity information 521 may also be laid out in a list type when the entity information 521 is information about at least two objects.

The main information 511, the main information-related information 512, the entity information 521, and the entity-related information 522 are each compressed information, and detail information about each of the main information 511, the main information-related information 512, the entity information 521, and the entity-related information 522 may be separately additionally provided according to user selection.

Figure 6:
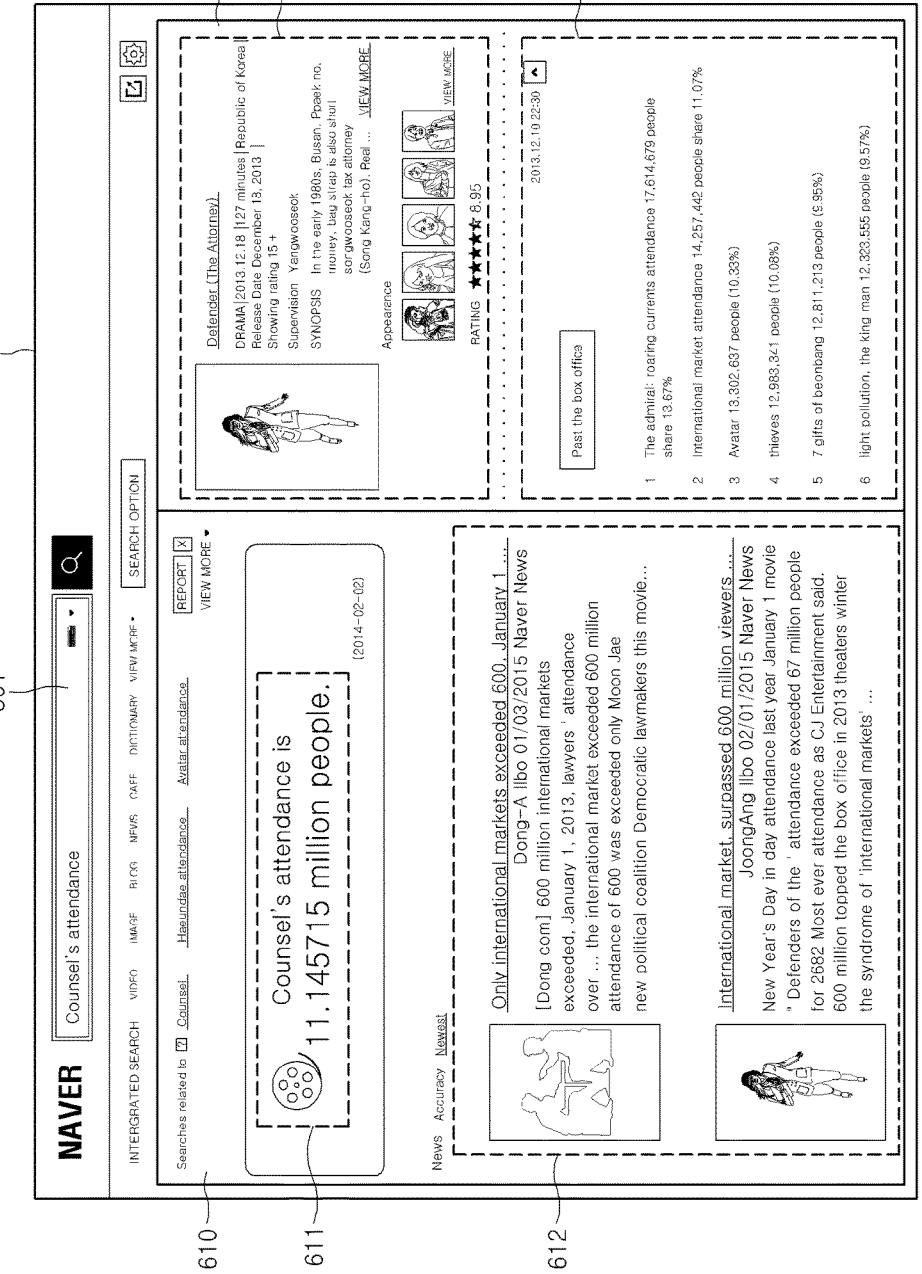
FIG. 6 is a diagram of a search result screen in a search system regarding a user query, according to an embodiment of the present invention.

FIG. 6 is a diagram of a search result screen 600 in the search system 100 regarding a user query 601, according to an embodiment of the present invention, wherein the user query has a single sentence structure.

Referring to FIG. 6, the search result screen 600 may be divided into a main information region 610 where the final search result on the user query 601 is provided, and an entity region 620 where information related to query entities is provided.

Main information 611 finally derived through the user query 601 and main information-related information 612 derived via a search using the user query 601 as a keyword are provided in the main information region 610, and entity information 621 and entity-related information 622 linked to an entity are provided in the entity region 620.

Here, when a search result corresponding to a user query type is a single type like a number and is in text, the search engine 130 may process the main information 611 to a sentence form including data derived according to MQL_config.

Figure 7:
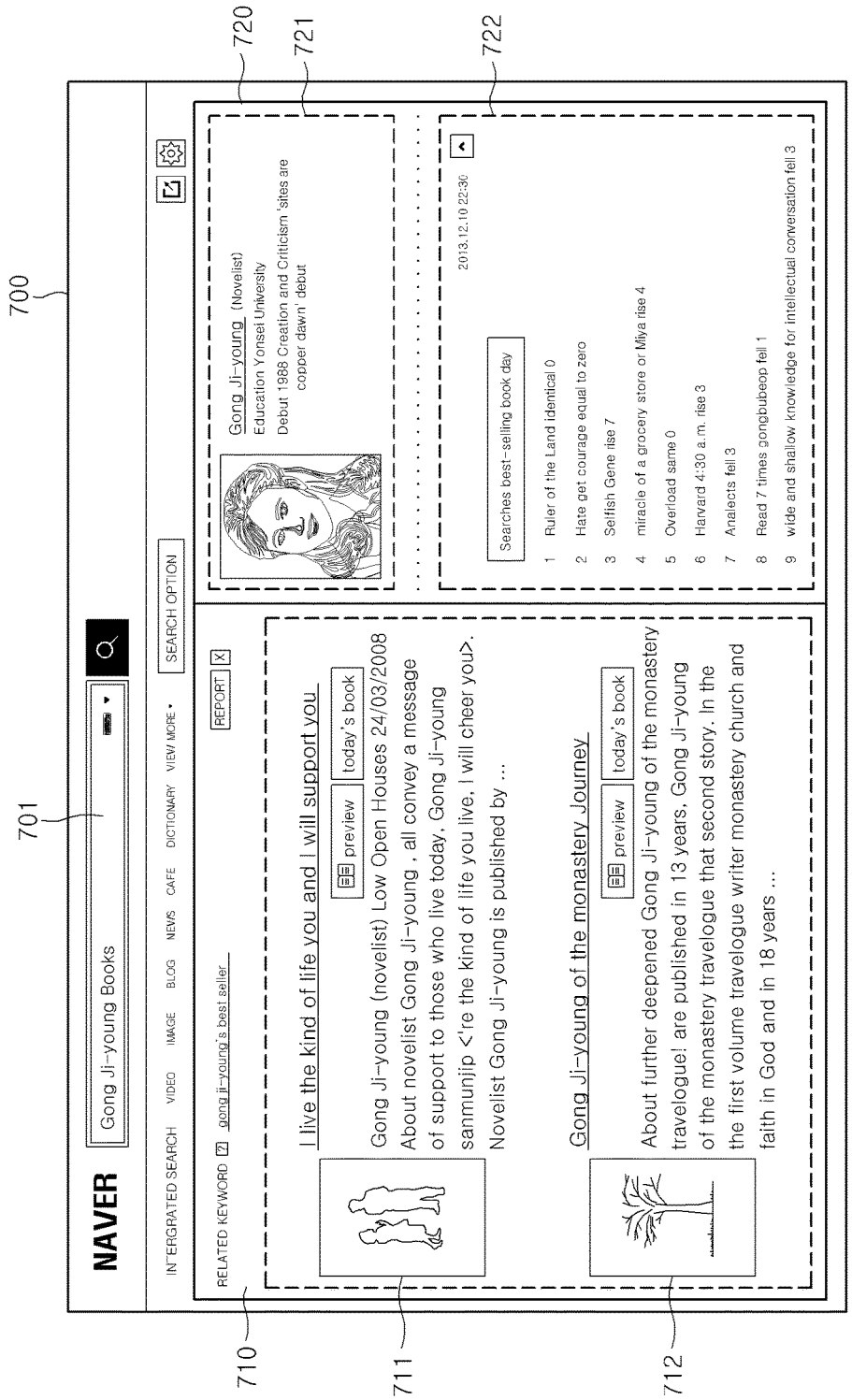
FIG. 7 is a diagram of a search result screen in a search system regarding a user query, according to another embodiment of the present invention.

FIG. 7 is a diagram of a search result screen 700 in the search system 100 regarding a user query 701, according to another embodiment of the present invention, wherein the search result screen 700 is a list type regarding the user query 701 having a single sentence structure.

Referring to FIG. 7, the search result screen 700 may be divided into a main information region 710 where a final search result on the user query 701 is provided, and an entity region 720 where information related to query entities is provided.

Here, when information derived as main information is at least two objects, the main information region 710 may provide main information 711 and 712 finally derived through the user query 701 as a list. Each piece of the main information 711 and 712 may be exposed in a form where detail information about each object is compressed.

Although not shown in FIG. 7, main information-related information may be additionally exposed in the main information region 710 in the similar manner.

Entity information 721 found based on an entity included in the user query 701 and entity-related information 722 are exposed in the entity region 720.

According to methods of laying out a search result screen, according to one or more embodiments of the present invention, described above with reference to FIGS. 5 through 7, user convenience may be increased by providing main information that is finally derived according to attributes of a user query having a simple sentence structure, together with entity information, on one search result screen.

Figure 8A:
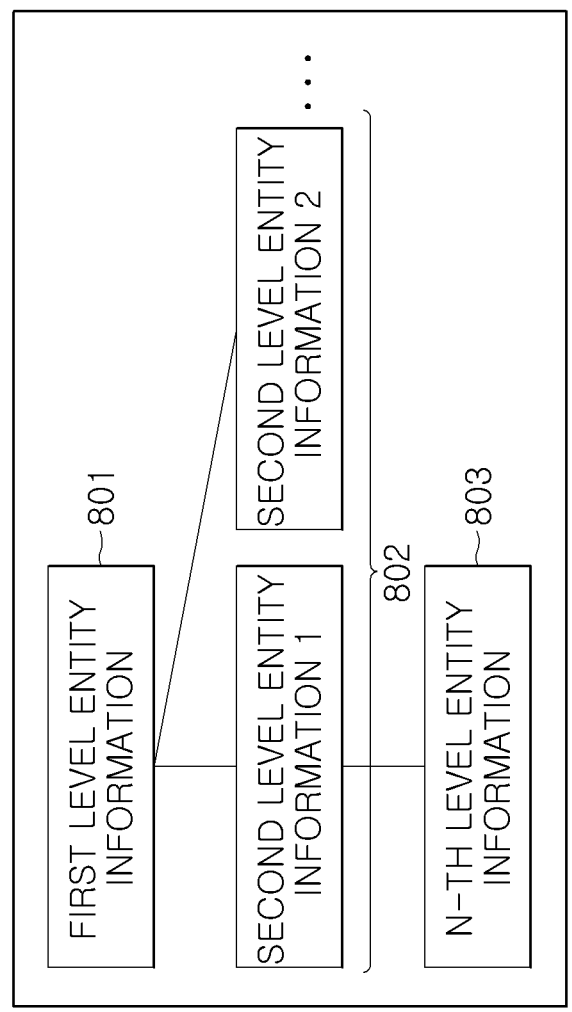
FIGS. 8A and 8B are diagrams for describing laying out of information derived by a search engine, according to another embodiment of the present invention.
Figure 8B:
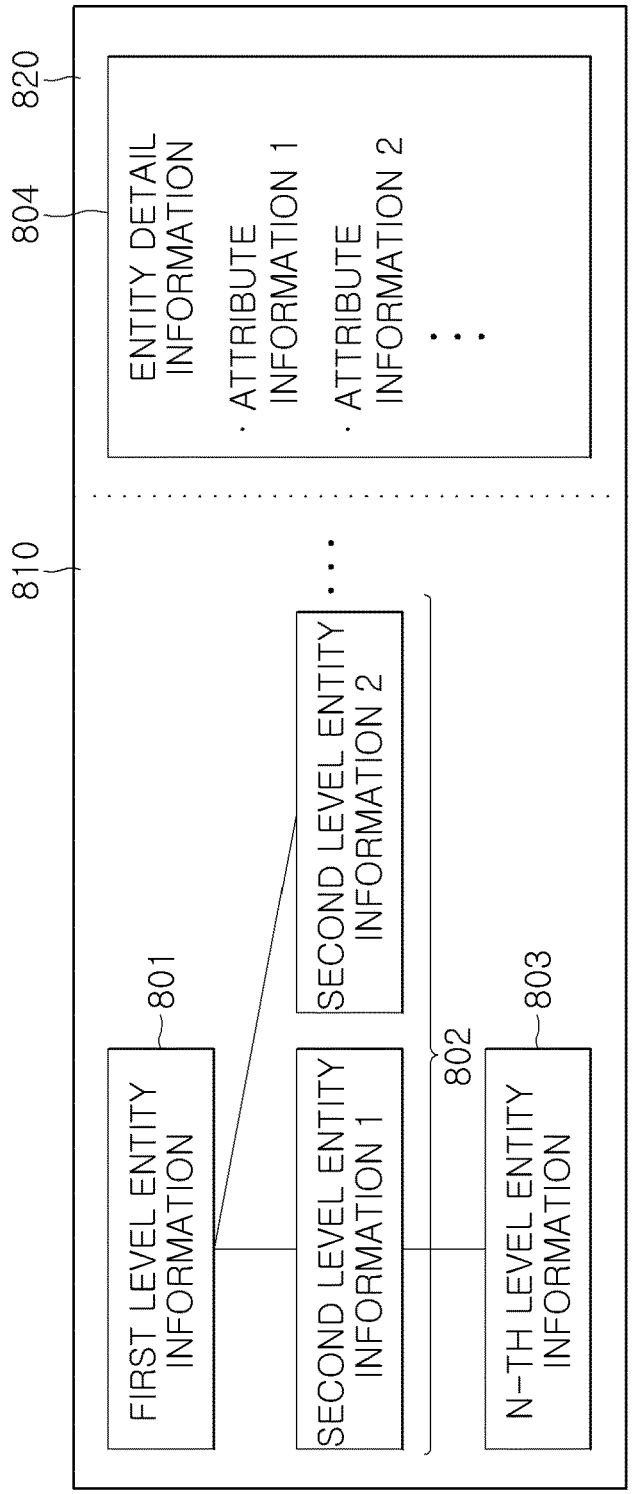

FIGS. 8A and 8B are diagrams for describing laying out of information derived by the search engine 100, according to another embodiment of the present invention, wherein search results on a user query having a complex sentence structure is provided.

The search engine 100 provides main information and entity information, which are derived as the search results of the user query, in a hierarchical structure according to attributes of an MQL having a tree structure, the MQL generated from the user query.

Referring to FIG. 8A, when the MQL has a hierarchical structure including a plurality of levels wherein a plurality of entities forming the user query are linked to each other, data derived according to a link from an upper entity to a lower entity may be hierarchically laid out. In other words, as shown in FIG. 8A, first level entity information 801 corresponding to a first level entity (upper entity) is output at an uppermost region, second level entity information 802 corresponding to a second level entity (intermediate entity) is output below the first level entity information 801, and n-th level entity information 803 corresponding to an n-th level entity is output below the second level entity information 802, thereby hierarchically providing data detected while analyzing a query language having a complex sentence structure. Here, the n-th level entity information 803 that is finally derived based on the link of the levels is main information and the first and second level entity information 801 and 802 are entity information.

Also, when the user query is a request for information about a single object, the main information may be laid out in a single type, and when the user query is a request for information about at least two objects, the main information may be laid out in a list type. In addition, when there are at least two entity information, the entity information may also be laid out in a list type.

Meanwhile, since detail information related to the main information and the entity information is provided in a compressed form, detail information corresponding to each entity may be additionally provided according to user selection.

Referring to FIG. 8B, when a user selects one piece of information from among the first through n-th level entity information 801 through 803 from a search result screen that is same as that of FIG. 8A, the search engine 130 may change a layout of the search result screen such that detail information 804 corresponding to the selected piece of information is output on a certain region of the search result screen. In other words, the search result screen may be re-processed to be divided into a compressed information region 810 where hierarchical entity compressed information is provided, and a detail information region 820 where detail information of a certain entity according to user selection is provided.

Figure 9:
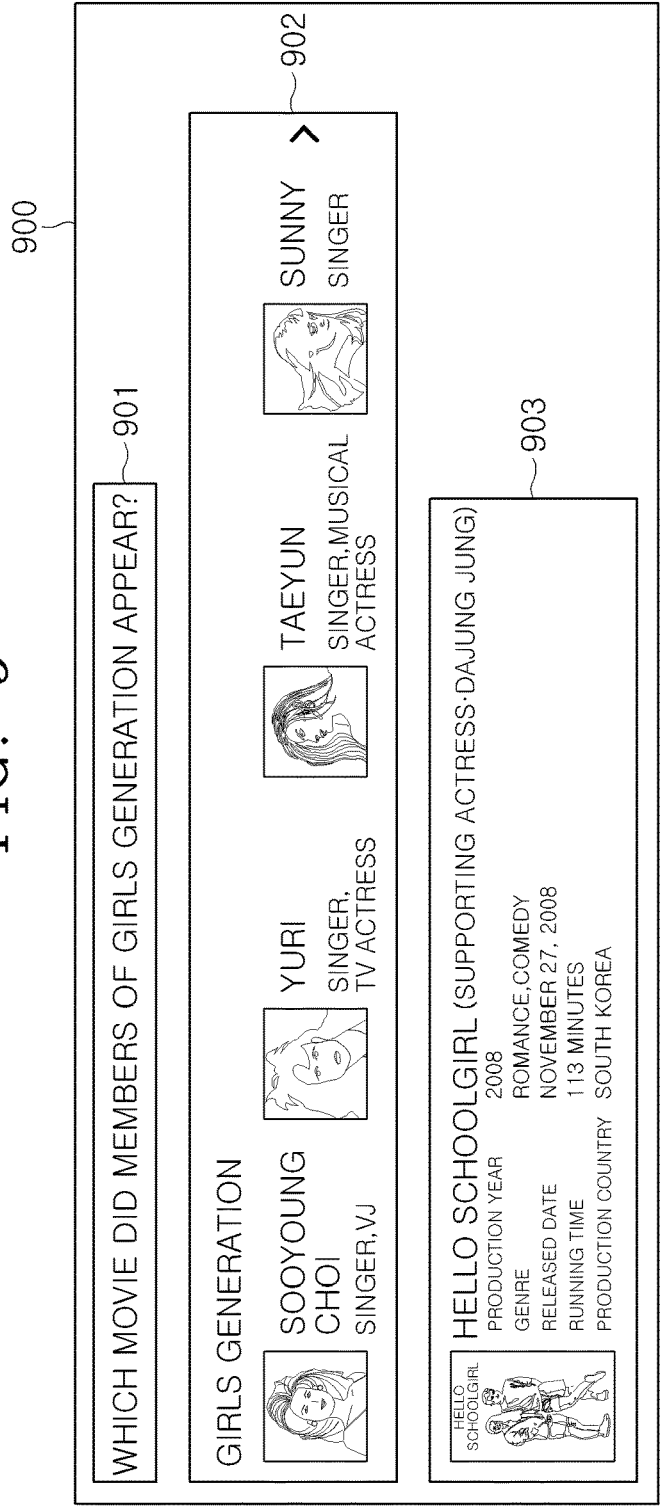
FIG. 9 is a diagram of a search result screen in a search system regarding a user query, according to another embodiment of the present invention.

FIG. 9 is a diagram of a search result screen 900 in the search system 100 regarding a user query 901, according to another embodiment of the present invention. In detail, the search result screen 900 is a list type regarding the user query 901 having a complex sentence structure.

Referring to FIG. 9, the search result screen 900 provides information about entities in a plurality of levels that are linked to each other, the entities derived from the user query 901 having the complex sentence structure, and hierarchically outputs the information from upper entity information 902 to lower entity information 903. Here, the lower entity information 903 corresponding to a lowermost level of the plurality of levels is a final search result requested by the user query 901 and corresponds to main information.

Since the upper entity information 902 and the lower entity information 903 of FIG. 9 include information about the search result and at least two objects, the upper entity information 902 and the lower entity information 903 are laid out in a list type.

Figure 10:
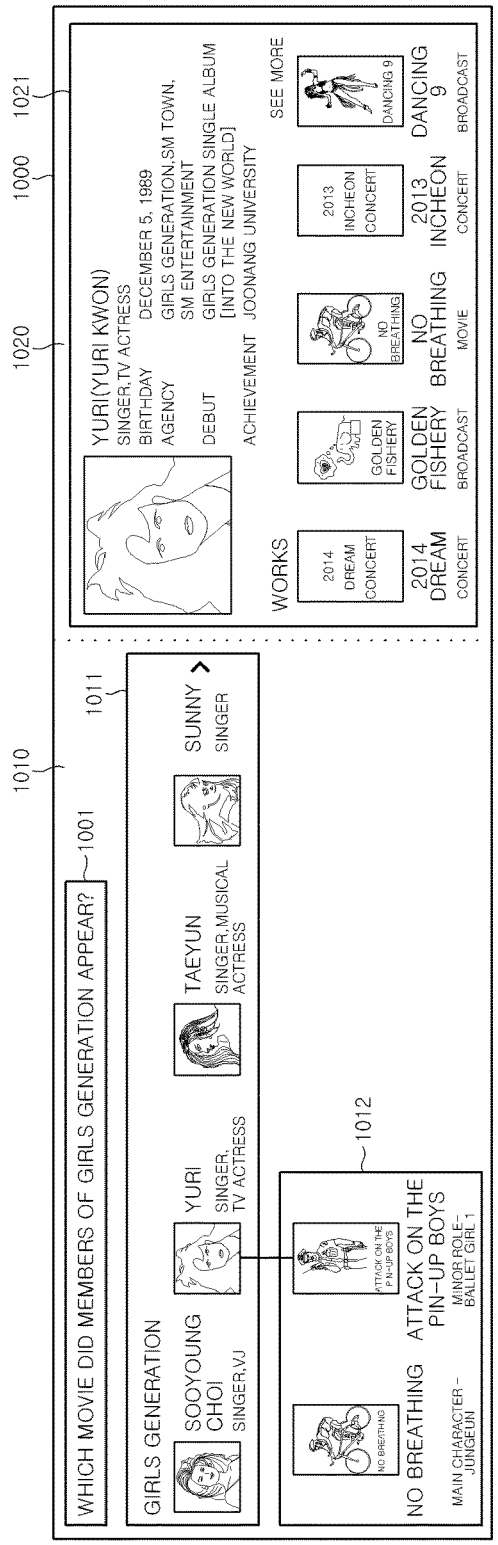
FIG. 10 is a diagram of a search result screen in a search system regarding a user query, according to another embodiment of the present invention.

FIG. 10 is a diagram of a search result screen 1000 in a search system regarding a user query 1001, according to another embodiment of the present invention.

In detail, FIG. 10 shows the search result screen 1000 in a list type regarding the user query 1001 having a complex sentence structure, wherein the search result screen 1000 includes entity detail information according to user selection received on the search result screen 900 of FIG. 9.

Referring to FIG. 10, the search result screen 1000 may be divided into a compressed information region 1010 where entity compressed information is provided according to a request to provide details about an entity with respect to the user query 1001, and a detail information region 1020 where entity detail information is provided. The compressed information region 1010 uses a hierarchical structure in which entities of levels are provided from upper entity information 1011 to lower entity information 1012, which are derived during a searching process as described above with reference to FIG. 9.

The detail information region 1020 outputs detail information 1021 about a certain entity selected by a user from among a plurality of entities in a plurality of levels. The detail information 1021 may be information derived based on at least one of an entity attribute, a domain, and a property according to MQL_config.

Accordingly, referring to FIGS. 9 and 10, the search engine 130 may provide a search result screen by laying out, in stages, main information based on entity information having a hierarchical structure and entity information per level, based on a user query input by a user, and when the user requests for detail information about a certain entity output on the search result screen, re-arrange spaces of the search result screen such that compressed information and the detail information are provided simultaneously.

As such, methods of laying out a search result screen, according to one or more embodiments of the present invention, described above with reference to FIGS. 8 through 10, may provide user convenience by outputting, in stages, compressed information per entity according to entity levels based on attributes of a user query having complex sentence structure, and when a user requests for entity detail information, providing the entity detail information and entity compressed information having a hierarchical structure through the same search result screen.

According to one or more embodiments of the present invention, accuracy of information matching a user query intention may be increased by analyzing a sense-tagged natural language query having a complex sentence structure and searching, in stages, data from an upper entity to a lower entity in a hierarchical tree structure.

Also, according to one or more embodiments of the present invention, a diversity of provided information, user convenience, and efficiency of a search service may be increased by extracting and efficiently providing, together with a search result on a query of a user, entity information related to at least one entity included a natural language query having a complex sentence structure.

The units and/or modules described herein may be implemented using hardware components, software components, or a combination thereof. For example, the hardware components may include microcontrollers, memory modules, sensors, amplifiers, band-pass filters, analog to digital converters, and processing devices, or the like. A processing device may be implemented using one or more hardware device(s) configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device(s) may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors, multi-core processors, distributed processing, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, and/or computer storage medium or device. The software also may be distributed over network coupled computer systems so that the software is stored and executed in a distributed fashion. The software and data may be stored by one or more computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A method of searching for and providing information about a natural language query, the method comprising:
generating, using a processor, a mashup query language based on at least one query entity included in a natural language query language via a semantic analysis of the natural language query language, the mashup query language having a tree structure in a plurality of levels, each of the plurality of levels being formed by a query entity, wherein the query entity provides a search target for deriving a search result through a knowledge database, wherein said generating the mashup query language extracts the query entity for each level and assigns at least one attribute to the query entity, the attribute including attribute information;
determining, using the processor, whether the plurality of levels are linked through the query entity forming the mashup query language of each of the plurality of levels based on the attribute information of the mashup query language assigned to the query entities;
searching, using the processor, for physical data in the knowledge database corresponding to the query entity forming the mashup query language of each of the plurality of levels from a knowledge database based on a result of the determining, and deriving main information and at least one piece of entity information corresponding to the natural language query language from the searched data, wherein the main information comprises final result data for the natural language query derived from said searching, and the entity information comprises physical data linked to the query entity for one or more of the plurality of levels that is searched during said searching, the entity information being used to derive the main information; and
laying out, using the processor, a search result screen on a display comprising the main information and the at least one piece of entity information on separate regions of the display.

2. The method of claim 1, wherein the generating of the mashup query language comprises:
determining whether at least two query phrases can be derived from the natural language query language via the semantic analysis of the natural language query language;
when it is determined that the at least two query phrases can be derived, deriving the at least two query phrases from the natural language query language; and
generating the mashup query language having the tree structure based on the at least two query phrases.

3. The method of claim 1, wherein generating the mashup query language further comprises assigning domain information relating to a query domain of each query entity, wherein the query domain comprises a semantic category of the search target or the attribute; and
wherein the determining of whether the plurality of levels are linked comprises:
analyzing the attribute information of the mashup query language and domain information of the mashup query language;
selecting search environment information corresponding to the mashup query language according to a result of the analyzing; and
normalizing the mashup query language by using the selected search environment information.

4. The method of claim 3, wherein the determining of whether the plurality of levels are linked further comprises converting the normalized mashup query language to an object query language by using the selected search environment information.

5. The method of claim 1, wherein, when it is determined that the plurality of levels are linked, the searching for the data corresponding to the query entity, comprises:
searching for and deriving data corresponding to an uppermost level entity of the mashup query language from the knowledge database; and
searching for and deriving data corresponding to consecutive lower level entities from the knowledge database based on the data corresponding to the uppermost level entity, wherein the searching for the data corresponding to the query entity is repeated until data corresponding to a lowermost level entity of the mashup query language is searched for and derived.

6. The method of claim 5, wherein the searching for the data corresponding to the query entity further comprises deriving the data corresponding to the lowermost level entity as the main information and deriving the data corresponding to the remaining level entities as the at least one piece of entity information.

7. The method of claim 6, wherein the laying out of the search result screen comprises outputting the data corresponding to the uppermost level entity at a top region of the search result screen and outputting the data corresponding to the consecutive lower level entities below the data corresponding to the uppermost level entity, wherein the data corresponding to the lowermost level entity is output as the main information.

8. The method of claim 1, wherein the laying out of the search result screen comprises processing the main information and the at least one piece of entity information to compressed information comprising at least one of at least one piece of attribute information, image information, and video information.

9. The method of claim 8, further comprising:
when a user input of selecting one of the at least one piece of entity information is received on the search result screen, processing the selected piece of entity information as entity detail information; and
changing a layout of the search result screen by dividing the search result screen into a compressed information region where the main information and the at least one piece of entity information are output, and a detail information region where the entity detail information is output.

10. The method of claim 1, wherein, when it is determined that the plurality of levels are not linked, the searching for the data corresponding to the query entity comprises:
deriving final result data by applying a logical operation according to a result of the semantic analysis on the data corresponding to the query entity of each of the plurality of levels.

11. The method of claim 10, wherein the searching for the data corresponding to the query entity further comprises deriving the final result data as the main information and the data corresponding to the query entity as the at least one piece of entity information.

12. The method of claim 11, wherein the laying out of the search result screen comprises laying out the search result screen by dividing the search result screen into a main information region where the main information and main information-related information are output, and an entity region where the at least one piece of entity information is output.

13. The method of claim 1, wherein the laying out of the search result screen comprises, when the main information is single attribute information, processing and providing the main information to a form of a natural language based response.

14. A system for searching for and providing information about a natural language query, the system comprising:
a natural language process engine comprising a processor executing a program stored in memory, the natural language process engine being configured to generate a mashup query language in a plurality of levels based on at least one query entity included in a natural language query language input through a user device in communication with the system via a semantic analysis of the natural language query language, the mashup query language having a tree structure in a plurality of levels, each of the plurality of levels being formed by a query entity, wherein the query entity provides a search target for deriving a search result through a knowledge database, wherein said generating the mashup query language extracts the query entity for each level and assigns at least one attribute to the query entity, the attribute including attribute information;
a knowledge database comprising physical data,
a search engine comprising the processor executing the program stored in memory, the search engine being configured to determine whether the plurality of levels are linked through the query entity forming the mashup query language of each of the plurality of levels based on the attribute information of the mashup query language assigned to the query entities, the search engine being further configured to search for physical data corresponding to the query entity forming each of the plurality of levels,
wherein the search engine processes, from the data corresponding to the query entity, main information and at least one piece of entity information, which correspond to the natural language query language, and displays the main information and the at least one piece of entity information on a same search result screen in separate regions of the search result screen, wherein the main information comprises final result data for the natural language query derived from said search for physical data, and the entity information comprises physical data linked to the query entity for one or more of the plurality of levels that is searched during said search for physical data, the entity information being used to derive the main information.

15. The system of claim 14, wherein the natural language process engine comprises:
a semantic analyzing module configured to determine whether at least two query phrases can be derived from the natural language query language via the semantic analysis of the natural language query language, and when it is determined that the at least two query phrases can be derived, derive the at least two query phrases from the natural language query language; and
a mashup query language converting module configured to generate the mashup query language based on the at least two query phrases.

16. The system of claim 14, wherein the search engine comprises:
a mashup query language normalizing module configured to analyze attribute information of the mashup query language to select search environment information corresponding to the mashup query language, and normalize the mashup query language by using the selected search environment information;
an object query language converting module configured to convert the normalized mashup query language to an object query language by using the selected search environment information;
a data deriving module configured to generate result data by searching for and deriving physical data of the object query language from a knowledge database according to the selected search environment information; and
a data processing module configured to process the result data according to the selected search environment information and generate a search result screen comprising the processed result data.

17. The system of claim 16, wherein, when the mashup query language normalizing module determines that the plurality of levels are linked, the data deriving module derives data corresponding to an uppermost level entity of the mashup query language from the knowledge database, derives data corresponding to consecutive lower level entities from the knowledge database based on the data corresponding to the uppermost level entity, and sequentially derives data corresponding to a lowermost level entity of the mashup query language.

18. The system of claim 17, wherein the data deriving module derives the data corresponding to the lowermost level entity as the main information and derives the data corresponding to remaining level entities as the at least one piece of entity information.

19. The system of claim 18, wherein the data processing module outputs the data corresponding to the uppermost level entity at a top region of the search result screen, outputs the data corresponding to the consecutive lower level entities below the data corresponding to the uppermost level entity, and outputs the data corresponding to the lowermost level entity as the main information.

20. The system of claim 19, wherein the data processing module processes the main information and the at least one piece of entity information to compressed information comprising at least one of at least one piece of attribute information, image information, and video information.

* * * * *